(12) United States Patent
Cheng et al.

(10) Patent No.: US 11,113,442 B2
(45) Date of Patent: Sep. 7, 2021

(54) METHODS AND APPARATUS FOR REDUCING RELIABILITY DEGRADATION ON AN INTEGRATED CIRCUIT

(71) Applicant: Intel Corporation, Santa Clara, CA (US)

(72) Inventors: Ning Cheng, San Jose, CA (US); Xiangyong Wang, San Jose, CA (US); Mahesh A. Iyer, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 15/718,685

(22) Filed: Sep. 28, 2017

(65) Prior Publication Data
US 2019/0095571 A1 Mar. 28, 2019

(51) Int. Cl.
*G06F 30/00* (2020.01)
*G06F 30/392* (2020.01)
*G06F 30/34* (2020.01)
*G06F 30/394* (2020.01)
*G06F 30/398* (2020.01)
*G06F 119/04* (2020.01)

(52) U.S. Cl.
CPC ............ *G06F 30/392* (2020.01); *G06F 30/34* (2020.01); *G06F 30/394* (2020.01); *G06F 30/398* (2020.01); *G06F 2119/04* (2020.01)

(58) Field of Classification Search
CPC .... G06F 2119/04; G06F 30/392; G06F 30/34; G06F 30/394; G06F 30/398
See application file for complete search history.

(56) References Cited

U.S. PATENT DOCUMENTS

| 6,327,694 | B1 * | 12/2001 | Kanazawa | G06F 30/392 |
| | | | | 716/122 |
| 6,584,606 | B1 * | 6/2003 | Chiu | G06F 30/367 |
| | | | | 716/112 |
| 6,671,869 | B2 * | 12/2003 | Davidson | G06F 30/30 |
| | | | | 716/117 |
| 7,210,115 | B1 * | 4/2007 | Rahim | G06F 30/367 |
| | | | | 716/113 |

(Continued)

OTHER PUBLICATIONS

Kim, "Circuit Reliability: Mechanisms, Monitors, and Effects in Near-Threshold Processors", University of Minnerota, Minneapolis, MN, 48 pages. (http://web.cse.ohio-state.edu/~teodorescu.1/workshops/wntc/resources/Slides/WNTC14_ChrisKim_061414.pdf>.

*Primary Examiner* — Naum Levin

(57) ABSTRACT

An integrated circuit with programmable logic circuitry is provided. The integrated circuit may include quiet regions, toggling regions, or unused regions. An integrated circuit may also include heavily-used metal routing paths, lightly-used metal routing paths, and unused metal routing paths. Circuit design tools may be used to generate multiple configuration images that replace the quiet regions with toggling or unused regions, that swap the heavily-used metal routing paths with lightly-used or unused metal routing paths, or that use random fitter seeds of improve the usage coverage to statistically reduce the always quiet regions on the integrated circuit. The multiple configuration images implement the same design and can be used to reconfigure the integrated circuit upon startup to reduce aging effects and improve circuit performance.

19 Claims, 11 Drawing Sheets

(56) References Cited

U.S. PATENT DOCUMENTS

| | | | | |
|---|---|---|---|---|
| 7,337,100 B1* | 2/2008 | Hutton | ............... | G06F 30/39 |
| | | | | 703/13 |
| 7,366,997 B1* | 4/2008 | Rahmat | ............... | G06F 30/00 |
| | | | | 716/111 |
| 7,401,304 B2* | 7/2008 | Li | ............... | G06F 30/20 |
| | | | | 716/111 |
| 8,136,076 B2* | 3/2012 | Bachina | ............... | G06F 30/34 |
| | | | | 716/126 |
| 8,176,448 B2* | 5/2012 | Koushanfar | ............... | G06F 30/30 |
| | | | | 716/102 |
| 8,286,112 B2* | 10/2012 | Miranda | ............... | G06F 30/3312 |
| | | | | 716/110 |
| 8,479,130 B1* | 7/2013 | Zhang | ............... | G06F 30/30 |
| | | | | 716/106 |
| 8,578,312 B2* | 11/2013 | Papanikolaou | ............... | G06F 30/30 |
| | | | | 716/110 |
| 8,713,490 B1* | 4/2014 | Allen-Ware | ............... | G06F 30/20 |
| | | | | 716/54 |
| 8,756,548 B2* | 6/2014 | Zievers | ............... | H04L 43/0811 |
| | | | | 716/117 |
| 8,819,603 B1* | 8/2014 | Clark | ............... | G06F 30/39 |
| | | | | 716/100 |
| 9,355,743 B2* | 5/2016 | Ghosh | ............... | G11C 29/02 |
| 9,412,473 B2 | 8/2016 | Chung | | |
| 9,455,715 B2* | 9/2016 | Pedersen | ............... | H03K 19/17752 |
| 9,494,641 B2 | 11/2016 | Smith et al. | | |
| 9,520,292 B2* | 12/2016 | Potkonjak | ............... | H01L 29/408 |
| 9,543,044 B2 | 1/2017 | Jain et al. | | |
| 2009/0224356 A1* | 9/2009 | Chandra | ............... | G06F 30/23 |
| | | | | 257/499 |
| 2014/0306687 A1 | 10/2014 | Ahmadi et al. | | |
| 2014/0306746 A1* | 10/2014 | Meneghini | ............... | G01R 31/31725 |
| | | | | 327/291 |

\* cited by examiner

METHODS AND APPARATUS FOR REDUCING RELIABILITY DEGRADATION ON AN INTEGRATED CIRCUIT

BACKGROUND

Modern integrated circuits may suffer from aging effects such as bias temperature instability (BTI) and hot carrier injection (HCI). Such aging effects can cause the behavior of transistors to degrade over time. For example, BTI will cause the threshold voltage of a transistor to change as a result of continued application of a high gate-to-source voltage on that transistor. Although this effect may be mitigated to some extent by reducing the voltage stress, this would reduce the performance of the circuit.

Integrated circuits such as programmable logic devices (PLD) often include performance critical circuits that are particularly vulnerable to aging effects. Programmable integrated circuits can be programmed by a user to implement a desired custom logic function. In particular, programmable integrated circuits include memory elements that are loaded with configuration data. These memory elements supply corresponding static control signals. The programmable integrated circuit includes programmable logic that receives the static control signals for long periods of time (e.g., static control signals having fixed polarities for six months or more).

For example, a PLD may be initially configured in which portions of the programmable logic is operated predominantly in one state. Portions of the programmable logic that are biased to one state are especially prone to aging effects. After some time (e.g., a year or more), those portions can experience a drive current degradation of 10% of more due to BTI, HCI, and other reliability issues.

It is within this context that the embodiments described herein arise.

DETAILED DESCRIPTION

The present embodiments relate to integrated circuits and, more particularly, to methods and apparatus for reducing reliability degradation on an integrated circuit. This can be achieved by generating multiple configuration images that implement the same functional design, where each of the configuration images shifts circuit blocks around such that non-toggling regions that suffer the greatest amount of stress are placed at different locations from one configuration to another.

In one suitable arrangement, the different configuration images will swap the locations of the non-toggling and toggling regions. In another suitable arrangement, the different configuration images are generated using random fitter seeds such that the non-toggling regions will be statistically relocated to a previously toggling/used region.

It will be recognized by one skilled in the art, that the present exemplary embodiments may be practiced without some or all of these specific details. In other instances, well-known operations have not been described in detail in order not to unnecessarily obscure the present embodiments.

Programmable integrated circuits use programmable memory elements to store configuration data. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

It may sometimes be desirable to reconfigure only a portion of the memory elements during normal operation. This type of reconfiguration in which only a subset of memory elements are being loaded with new configuration data is sometimes referred to as "partial reconfiguration" (e.g., it may sometimes be advantageous to reconfigure only a portion of the configuration bits using a process known as partial reconfiguration). During partial reconfiguration, new data should be written into a selected portion of memory elements (sometimes referred to as "memory cells").

Figure 1:
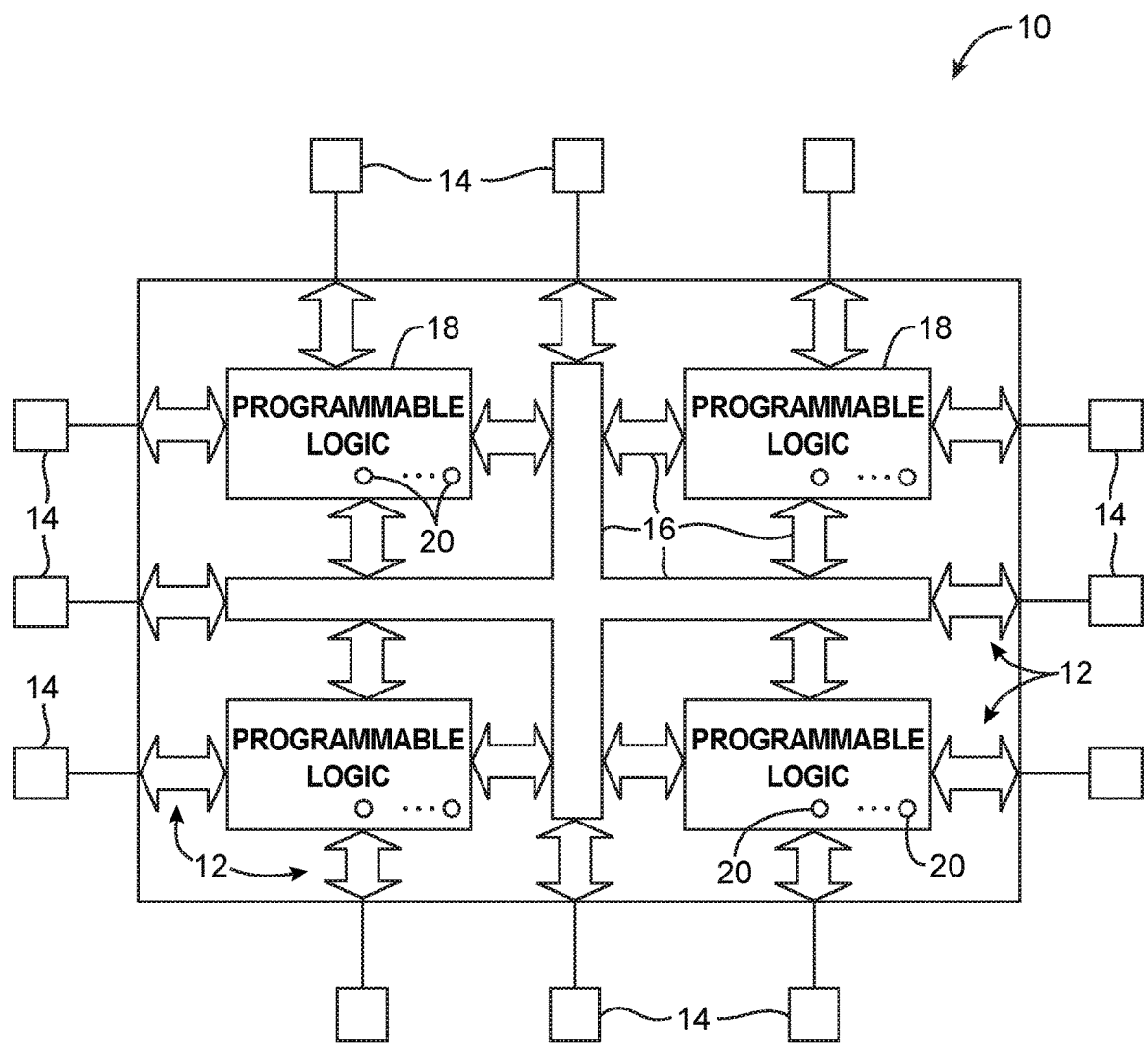
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
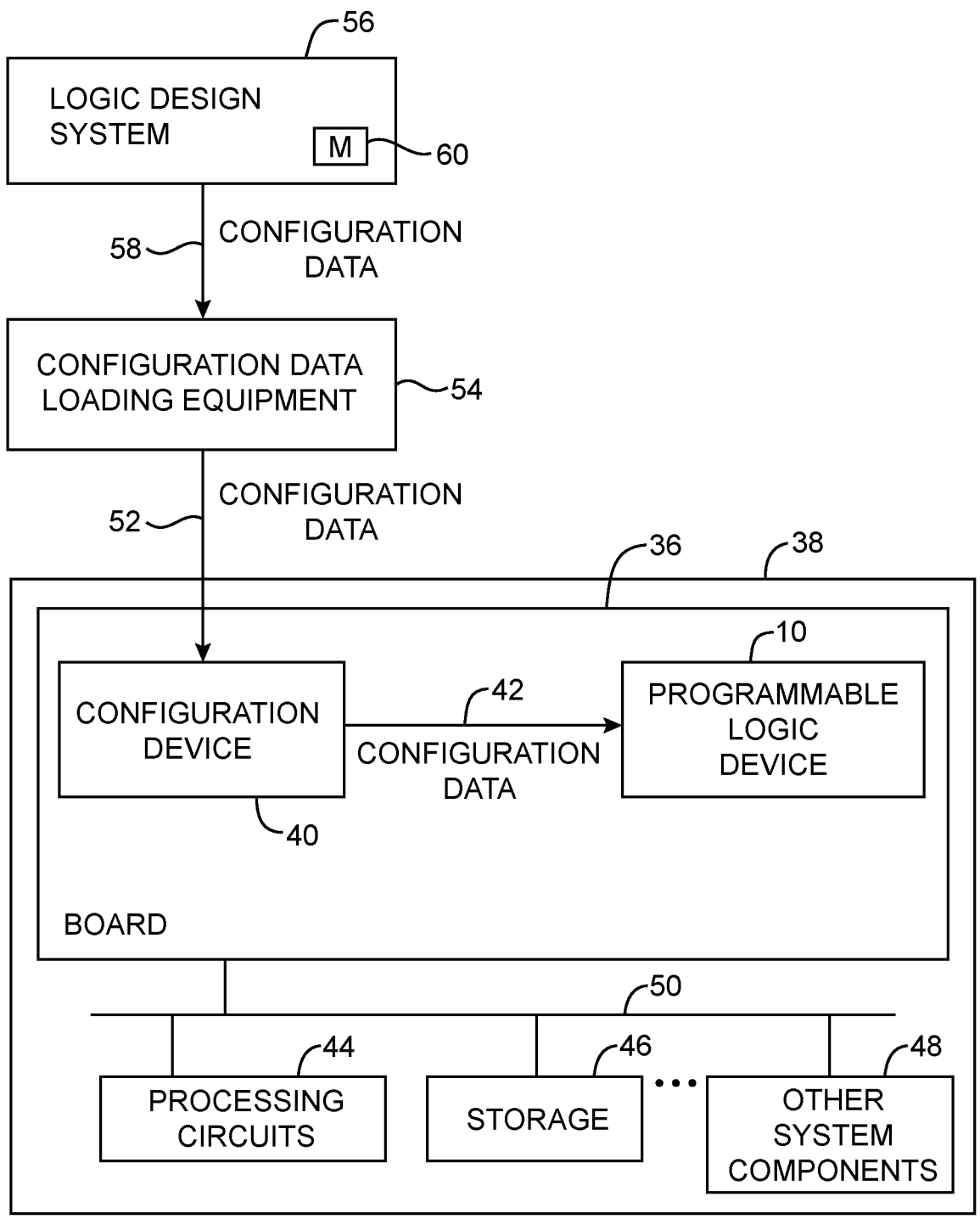
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

Figure 3:
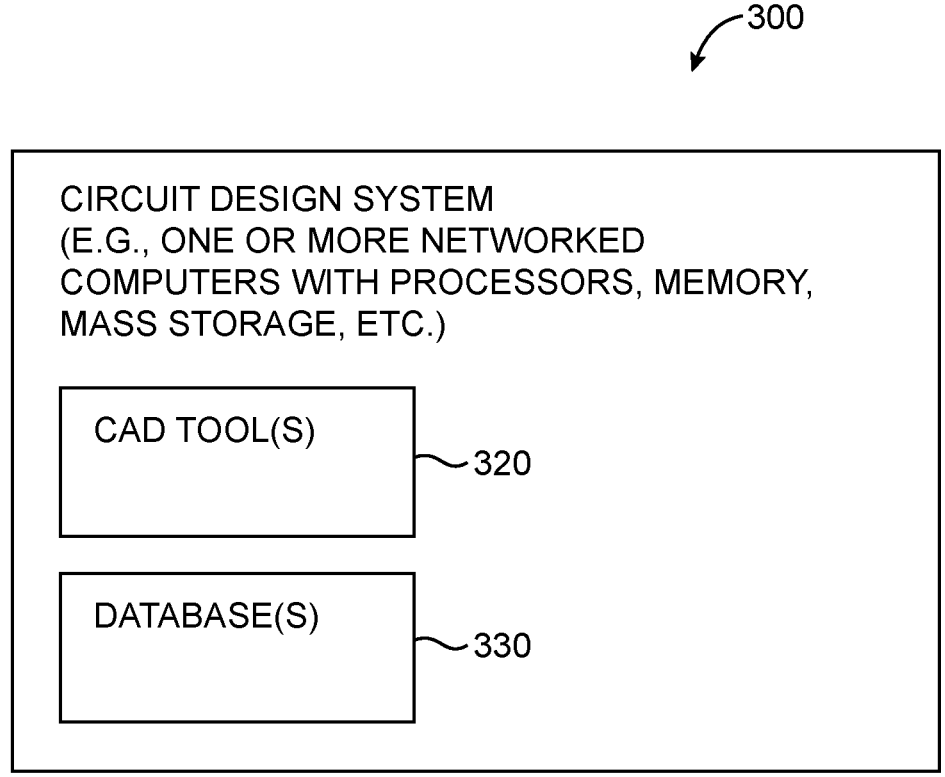
FIG. 3 is a diagram of a circuit design system that may be used to design integrated circuits in accordance with an embodiment.

An illustrative circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods (processes). When performing these processes, the computing equipment is configured to implement the functions of circuit design system 300.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
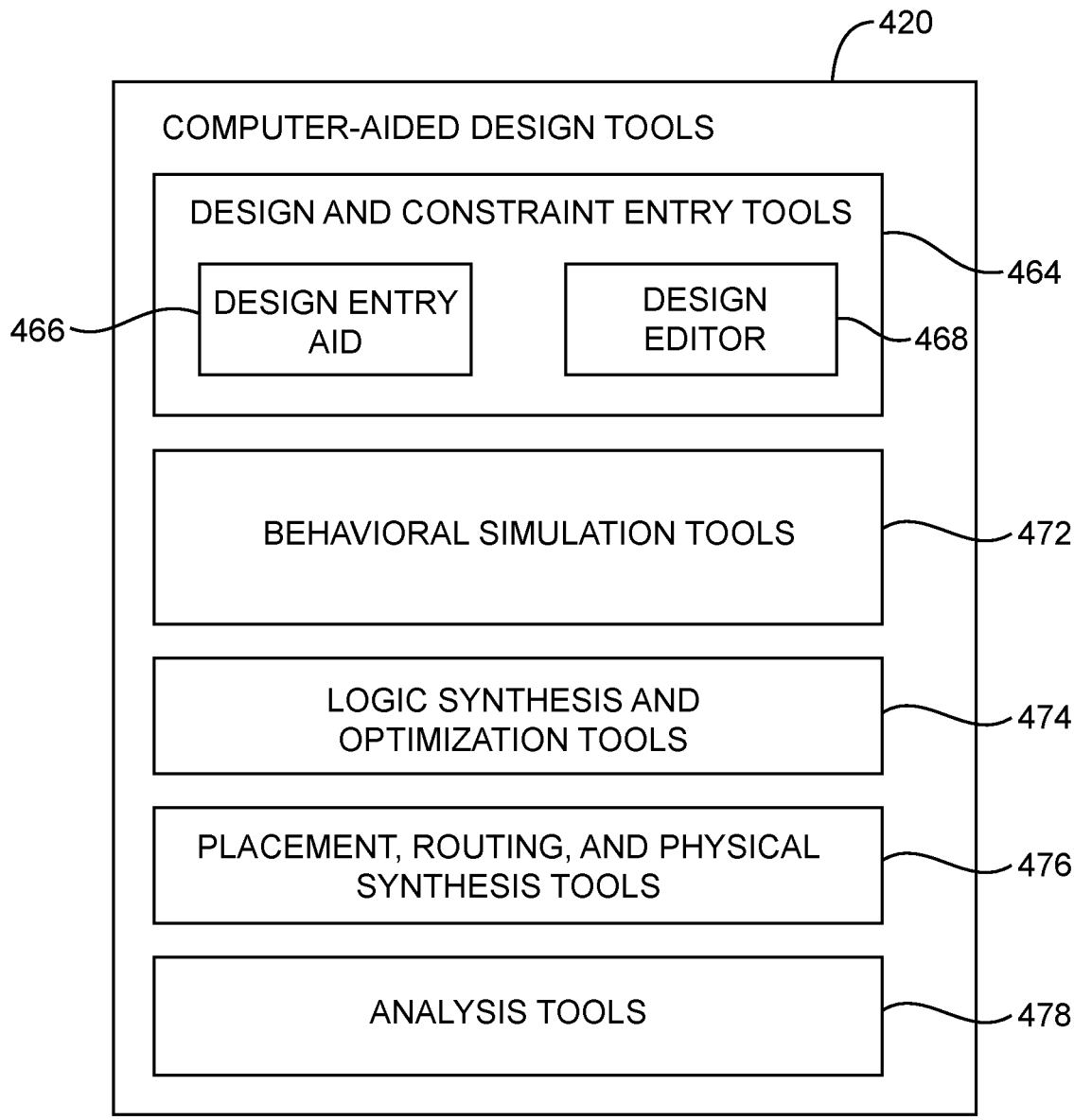
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
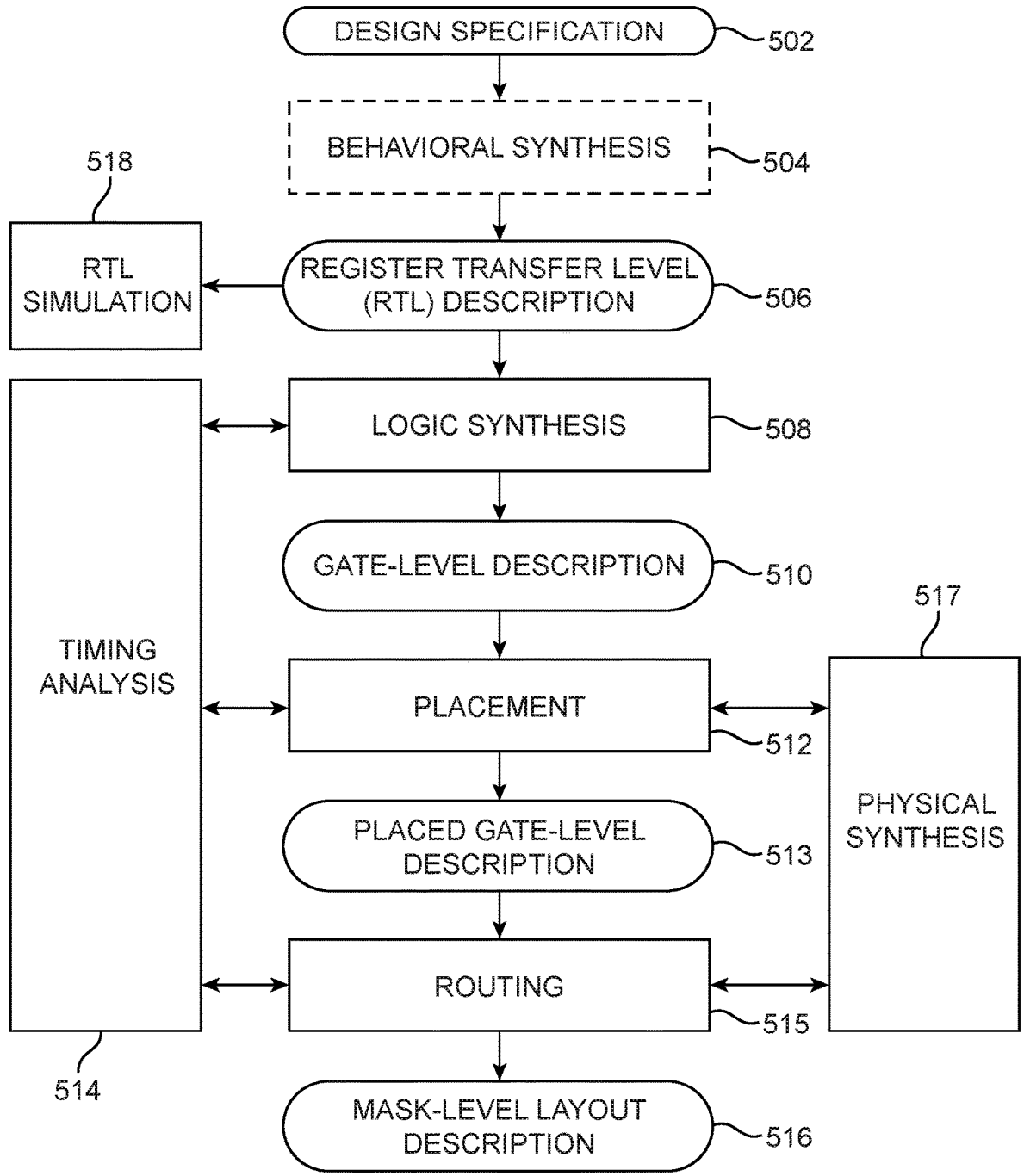
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-by-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a preferred location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a mask-level layout description 516 (sometimes referred to as routed gate-level description 516).

While placement and routing is being performed at steps 512 and 515, physical synthesis operations 517 may be concurrently performed to further modify and optimize the circuit design (e.g., using physical synthesis tools 476 of FIG. 4).

The mask-level layout description 516 generated by the design flow of FIG. 5 may sometimes be referred to as a device configuration bit stream or a device configuration image. Conventional methods for designing a programmable integrated circuit involves generating only one image for a particular user application. Thus, if the intended user application does not change, that same image is used to configure the programmable integrated circuit over and over again. Doing so will, however, leave certain portions of the integrated circuit more stressed than others, which can result in device-level degradation that will negatively impact the performance of the integrated circuit over time.

Studies have shown that reliability aging degradation results at least partly from biased temperature instability (BTI) and hot carrier injection (HCI), the effects of which are exacerbated when a circuit receives signals that are non-toggling (e.g., when a particular device component receives data signals, bias signals, or control signals that are fixed at a constant voltage level). For example, an n-channel transistor having a gate terminal that always receives a logic "1" and a p-channel transistor with a gate terminal that always receives a logic "0" and when the signal does not toggle at the source-drain terminals of the transistor are considered to be operating under a "quiet" condition.

Circuits operating in quiet conditions can experience degradation in transistor saturation currents by up to 10% or more. In contrast, circuits operating in non-quiet conditions in which the circuits receive dynamic toggling signals (e.g., data, bias, or control signals that vary in time and swinging between logic "0" and "1") may only experience transistor saturation current degradation by 4% or less. The non-quiet condition is therefore sometimes referred to as a toggling condition.

In accordance with an embodiment, the reconfigurability of programmable device 10 (FIG. 1) can be leveraged to address reliability concerns such as aging and electromigration by using the CAD tools described in connection with FIGS. 3-5 to perform smart recompilation to generate multiple different configuration images of the same design. By generating varying configuration images of the same design for a given programmable integrated circuit, the functionality is preserved while avoiding repeatedly applying the highest reliability stress onto the same device resources. In this way, the reliability of the overall chip can be substantially improved, and performance improvements of 3% or more can be observed over the lifespan of device 10.

In one suitable arrangement, the design tools are configured to intelligently rearrange resources by placing a toggling region (i.e., a region on device 10 with circuits that are currently operated in a predominately toggling condition) into a previously quiet region (i.e., a region on device 10 with circuits that are currently operated in a predominately quiet condition) during image recompilation to help mitigate device aging.

Figure 6A:
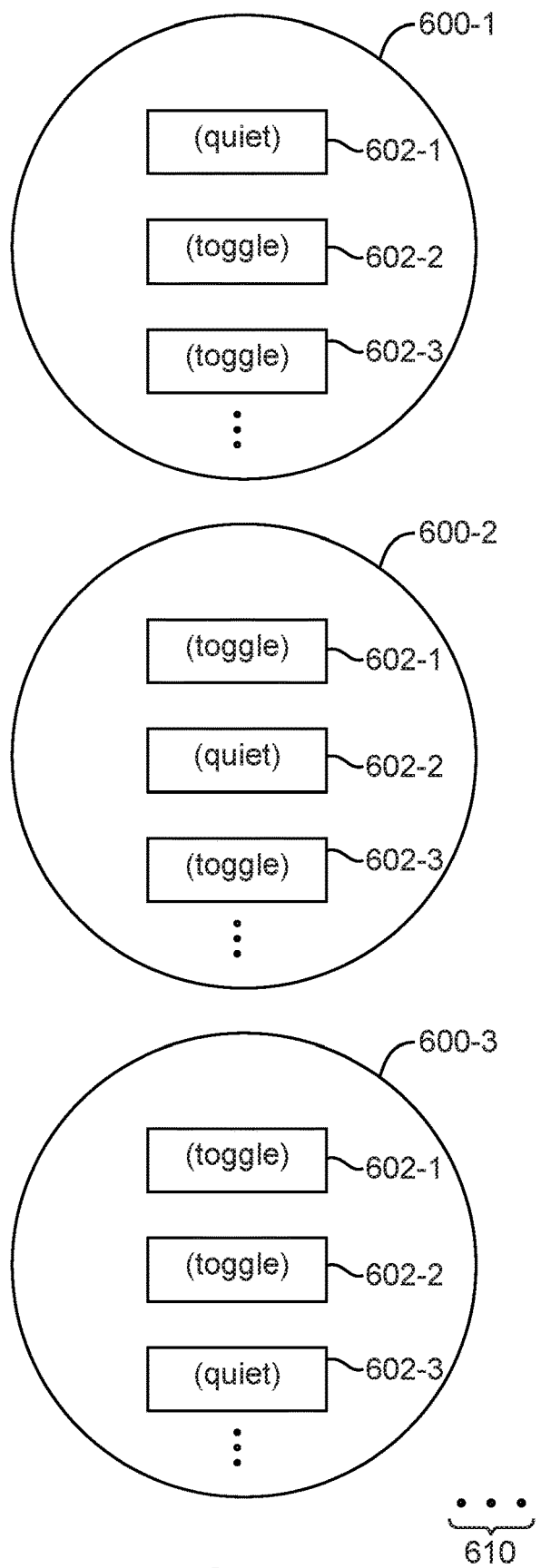
FIGS. 6A and 6B are diagrams showing multiple configuration bit streams that implement the same design but designate quiet regions to different logic regions on an integrated circuit in accordance with an embodiment.

FIG. 6A is a diagram showing multiple configuration images that implement the same design but designate quiet regions to different logic regions on device 10. FIG. 6A shows at least three different configuration images 600-1, 600-2, and 600-3 that can be generated by the design tools. In this example, device 10 may include a first logic circuit 602-1, a second logic circuit 602-2, and a third logic circuit 602-3. Logic circuits 602 may be lookup table (LUT) circuits, memory blocks, digital signal processing blocks, or other logic region on device 10.

In the first image 600-1, the first logic circuit 602-1 may be a quiet region, whereas logic circuits 602-2 and 602-3 are toggling regions. In the second image 600-2, the quiet region may be moved to circuit 602-2, whereas logic circuit 602-1 (which was a quiet region in image 600-1) now becomes a toggling region. In the third image 600-3, the quiet region may be moved to circuit 602-3, whereas logic circuits 602-1 and 602-2 are toggling regions. In general, a quiet region may swap places with any toggling region. If desired, only regions that are changing may be updated via partial reconfiguration operations to reduce system downtime.

Programmable device 10 typically includes a large amount of available logic resources, at least a portion of which is unused for any given application (i.e., a custom user design rarely utilizes 100% of the available programmable resources on device 10). Unused regions on device 10 may experience no transistor saturation current degradation.

Figure 6B:
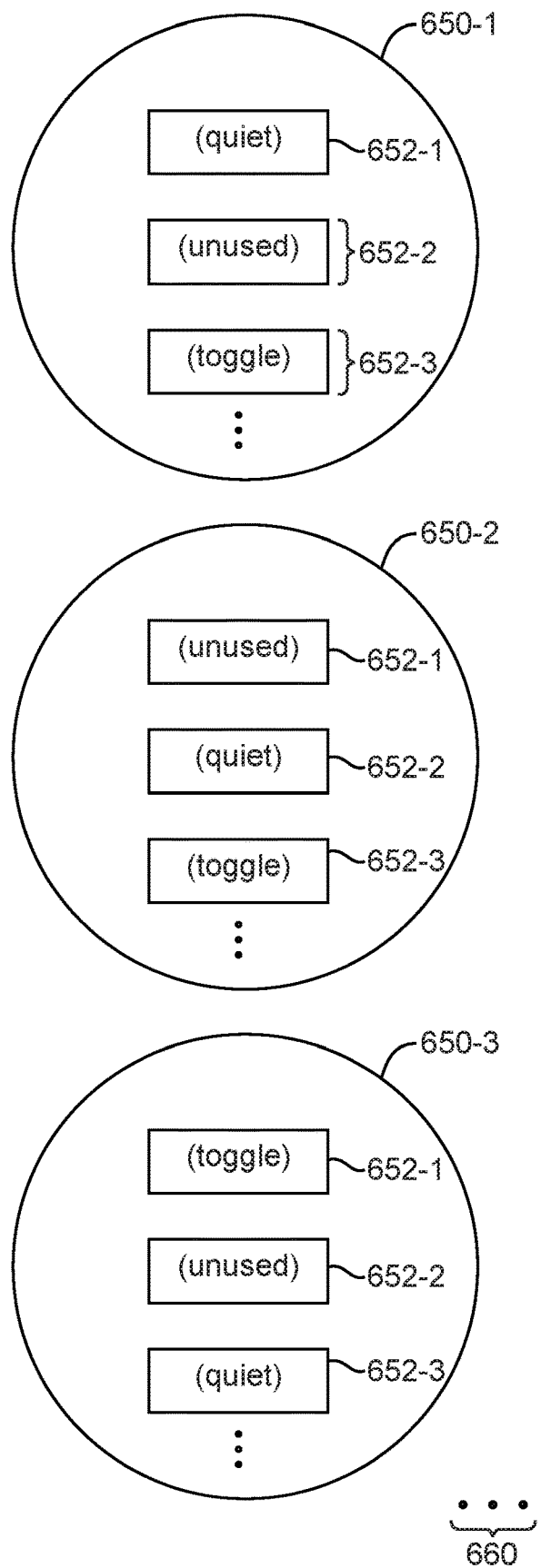

FIG. 6B is a diagram showing multiple configuration images that take advantage of unused regions to help quiet regions experiences less aging. FIG. 6B shows at least three different configuration images 650-1, 650-2, and 650-3 that can be generated by the design tools. In this example, device 10 may include a first logic circuit 652-1, a second logic circuit 652-2, and a third logic circuit 652-3. In the first image 650-1, the first logic circuit 652-1 may be a quiet region, logic circuit 652-2 may be an unused region, and logic circuit 652-3 may be a toggling region. In the second image 650-2, the quiet region may be moved to circuit 652-2, whereas logic circuit 652-1 (which was a quiet region in image 650-1) now becomes an unused region. In the third image 650-3, the quiet region may be moved to circuit 652-3, whereas logic circuit 652-1 (which was a quiet region in image 650-1) now becomes a toggling region. In general, a quiet region may swap places with any toggling or quiet region. If desired, only regions that are changing may be updated via partial reconfiguration operations to reduce system downtime.

The examples of FIGS. 6A and 6B in which the design tools are configured to generate at least three different configuration bit streams are merely illustrative. In general, device 10 may include more than three logic circuits/regions, any portion of which can be considered quiet, toggling, unused, or labeled as appropriate to signify some other level of activity. If desired, the circuit design tools may be used to generate at least two different configuration bit streams or more than three different configuration bit streams to move the quiet regions around in an effort to improve device reliability.

In addition to BTI and HCI, electromigration can also contribute to device aging over time. Electromigration is the transport of material caused by the gradual movement of ions in a conductor due to the momentum transfer between conducting electrons and diffusing metal ions. Electromigration is exacerbated in smaller wires (which is typical in modern integrated circuits) and also in heavily-used metal routing paths that convey high currents for an extended period of time. In accordance with another embodiment (which is not mutually exclusive with those of FIGS. 6A and 6B), the design tools can be configured to generate different configuration images that swap heavily-used metal routing paths with lightly-used metal routing path to help mitigate electromigration. For example, a heavily-used metal may carry more than 0.5 mA of current over 90% of the time, whereas a lightly-used metal might carry less than half the current of the heavily-used metal or might only carry over 0.5 mA of current less than 10% of the time.

Figure 7:
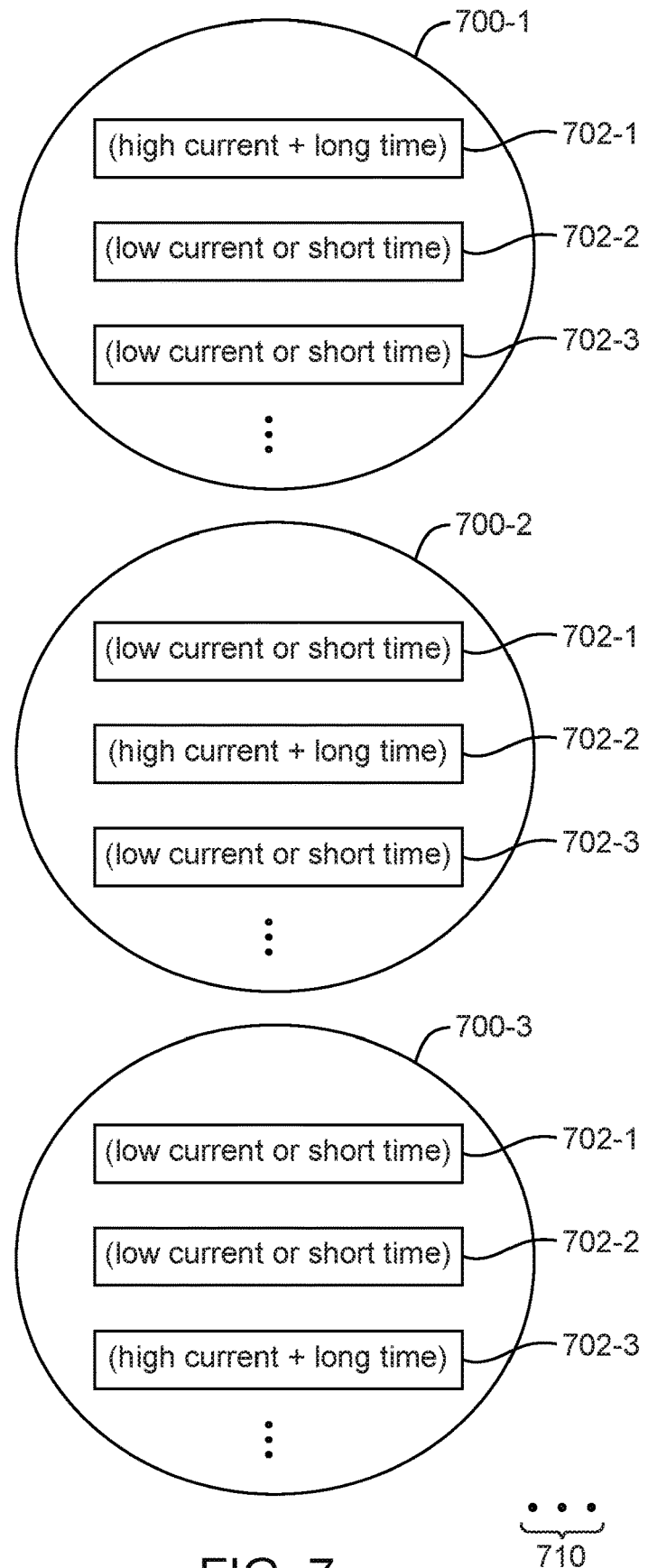
FIG. 7 is a diagram showing multiple configuration bit streams that implement the same design but designate heavily-used metal to different routing paths on an integrated circuit in accordance with an embodiment.

FIG. 7 shows at least three different configuration images 700-1, 700-2, and 700-3 that can be generated by the integrated circuit design tools. In this example, device 10 may include a first conductive signal path 702-1, a second conductive signal path 702-2, and a third conductive signal path 702-3. Conductive signal paths 702-1, 702-3, and 702-4 may be physically separate metal routing paths having the same or different widths and/or lengths on device 10. In the first image 700-1, metal path 702-1 is used to convey high current for an extended time period, whereas metal paths 702-2 and 702-3 are used to carry relatively lower currents or only convey currents over relatively short time periods. Configured as such, metal path 702-1 may represent a heavily-used metal that can potentially suffer from electromigration and other reliability issues if left unattended. In contrast, the metal paths carrying lower currents or currents over short time periods may represent lightly-used metal that is more resistant to electromigration and other aging effects.

In the second image 700-2, the heavily-used signal path may be moved to metal 702-2, whereas metal 702-1 (which was a heavily-used signal path in image 700-1) now becomes a lightly-used metal. In the third image 700-3, the heavily-used signal path may be moved to metal 702-3, whereas metal 702-1 and 702-2 are both lightly-used signal paths. In general, a heavily-used metal may swap places with any lightly-used metal or even unused metal (i.e., a metal routing path that is inactive and is not being used to carry any signals). If desired, only routing portions that are swapped may be updated via partial reconfiguration operations to reduce system downtime.

The examples of FIG. 7 in which the design tools are configured to generate at least three different configuration bit streams are merely illustrative. In general, device 10 may include more than three conductive metal paths, any portion of which can be considered heavily-used, lightly-used, unused, or otherwise labeled to signify some other level of signal/current activity. If desired, the circuit design tools may be used to generate at least two different configuration bit streams or more than three different configuration bit streams to move the heavily-used metal paths around in an effort to mitigate electromigration.

The circuit design tools may be configured to analyze signal toggle activity profile data to ensure that a quiet region is replaced by a toggling region during recompilation (i.e., when generating a different configuration image). Signal toggle profile data can be obtained from the user/customer or can be obtained by performing gate-level simulation.

Figure 8:
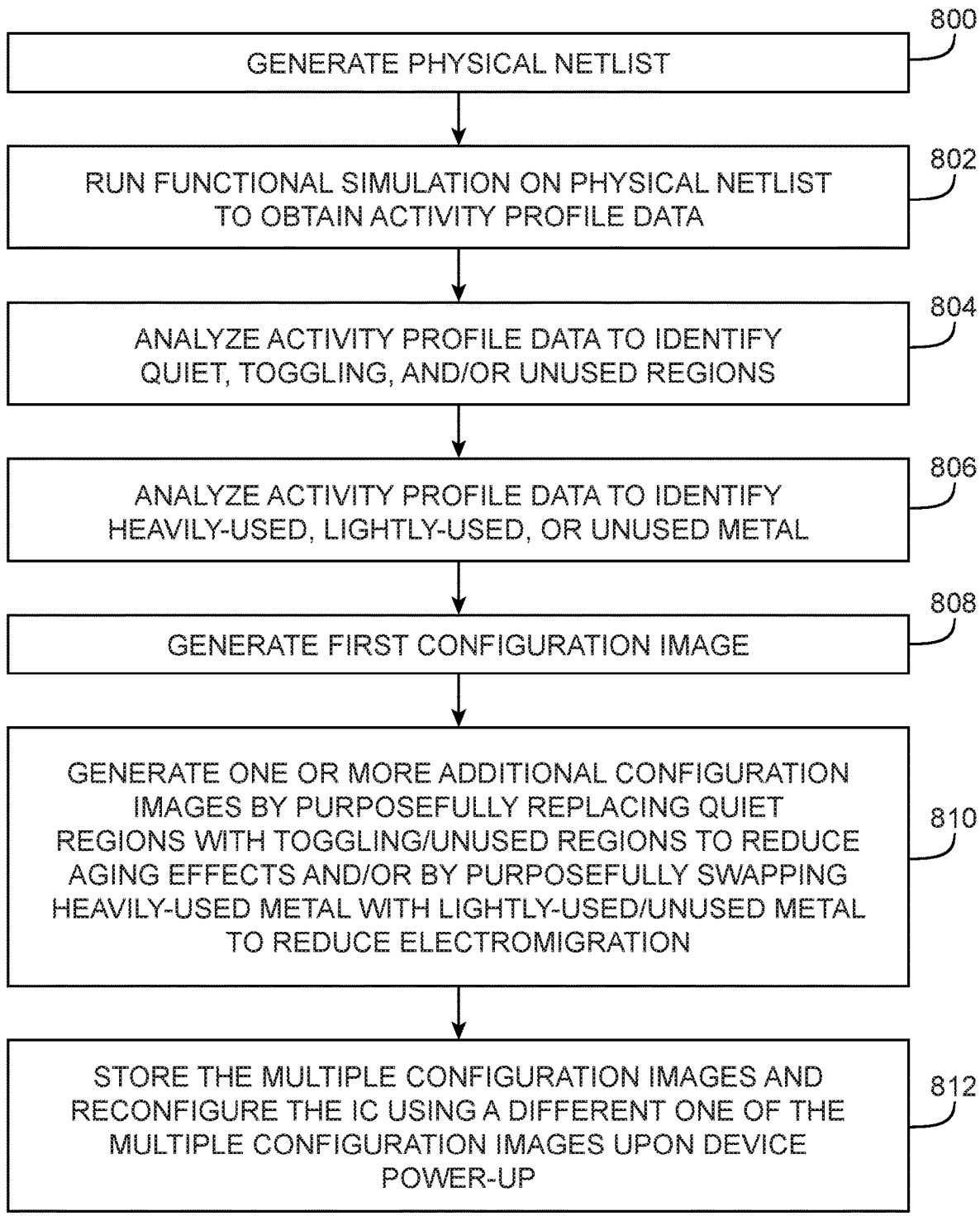
FIG. 8 is a flow chart of illustrative steps for performing targeted switching of quiet regions, toggling regions, and unused regions to help mitigate reliability issues in accordance with an embodiment.

FIG. 8 is a flow chart of illustrative steps for using circuit design tools (e.g., tools 320 of FIG. 3 and tools 420 of FIG. 4) to purposefully perform switching of quiet regions, toggling regions, and unused regions to help mitigate reliability issues.

At step 800, the circuit design tools may generate a physical netlist. This physical netlist may be a post place-and-route gate-level description of the circuit design.

At step 802, the circuit design tools may then run functional simulation on the physical netlist to obtain signal activity profile data. The functional simulation may probe each node or gate in the physical netlist and record the amount of signal toggling activity and also the amount of current observed over a test period to generate the activity profile data.

At step 804, the circuit design tools may analyze the activity profile data to identify any quiet, toggling, and/or unused circuit regions on in the design. At step 806, the circuit design tools may optionally analyze the activity profile data to identify heavily-used metal, lightly-used metal, and/or unused metal in the design.

At step 808, a first configuration image is output. The first configuration image may be loaded into device 10 to implement a given custom logic design.

At step 810, the circuit design tools may generate one or more additional configuration images by purposefully replacing quiet regions with toggling or unused regions to reduce aging/derating effects. During this step, the circuit design tools may also purposefully swap heavily-used metal routing paths with lightly-used or unused metal routing paths to reduce electromigration.

The multiple configuration images generated in this way may be stored locally on-chip or off-chip (such as on configuration device 40 in FIG. 2). Device 10 may be reconfigured using a different one of the multiple configuration images every time device 10 is restarted (step 812). Configured in this way, multiple configuration bit streams implementing the same design can be generated. The multiple bit streams are used in turn during reconfiguration to avoid repeatedly positioning high-stress areas at the same locations on device 10.

The techniques described in connection with FIGS. 6-8 are directed towards purposeful or intentional swapping out circuit components suffering from elevated stress levels with circuit components experience lower stress levels among different configuration images. In accordance with another suitable embodiment, the circuit design tools may be configured to statistically reduce the quiet regions by increasing the overall usage coverage on device 10. As described above, most user designs will not utilize 100% of the available logic resources on device 10. This allows logic resources to be shifted around without changing the actual functionality.

Figure 9:
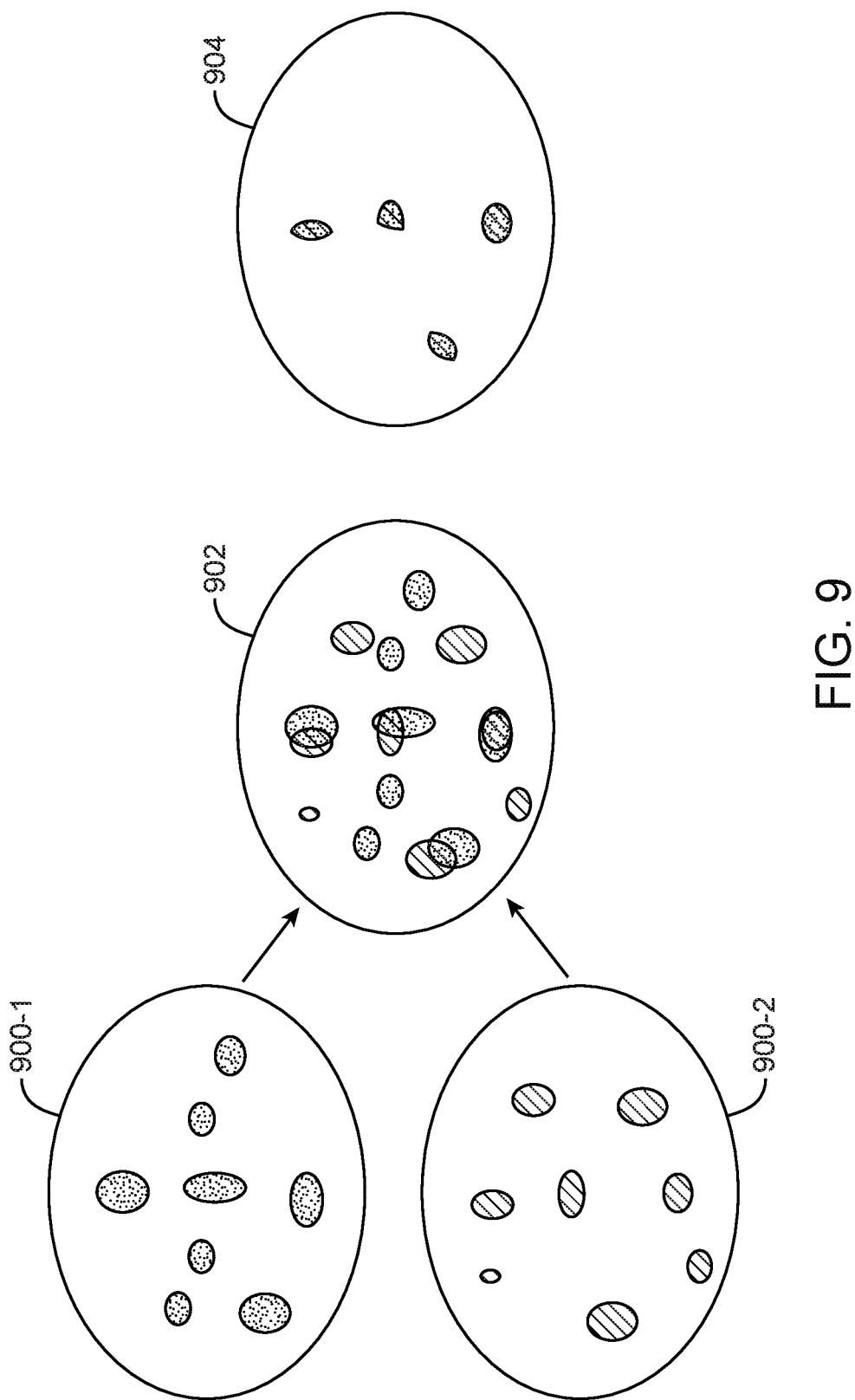
FIG. 9 is a diagram showing how an integrated circuit configured using different configuration bit streams to implement the same design can have non-overlapping quiet regions or unused regions in accordance with an embodiment.

FIG. 9 is a diagram showing how an integrated circuit configured using different configuration bit streams to implement the same design can have non-overlapping quiet regions or unused regions. FIG. 9 illustrates a first configuration image 900-1 and a second configuration image 900-2. The shaded regions within image 900-1 represents the quiet or unused regions on the integrated circuit device, whereas the shaded regions within image 900-2 represents the quiet or unused regions on the integrated circuit device. Plot 902 overlays the two images to show how at least some of the quiet and unused regions are non-overlapping. Plot 904 shows the overlapping regions, which is a much smaller subset of the original quiet/unused regions in image 900-1.

By varying the device usage pattern on device 10 (e.g., by reducing or minimizing the overlapping regions shown in pot 904), the probability of repeated configuration of quiet stress areas at the same location on device 10 is lowered, thereby achieving substantially less transistor aging and improved circuit performance over the lifespan of device 10. In other words, the always quiet regions on device 10 are significantly reduced, which reduces BTI, HCI, and other reliability issues.

The images of FIG. 9 may be generated using circuit design tools based on random fitter seeds. Fitter seeds affect the initial placement configuration of the circuit design (see, e.g., FIG. 5, fitter seeds may be selectively applied to gate-level description 510 prior to or during placement 512). Changing the seed value changes the initial conditions, thereby changing the fitter or placement results. Thus, each different seed value results in a somewhat different fit, leading to slightly varying resource usage patterns on device 10.

Figure 10:
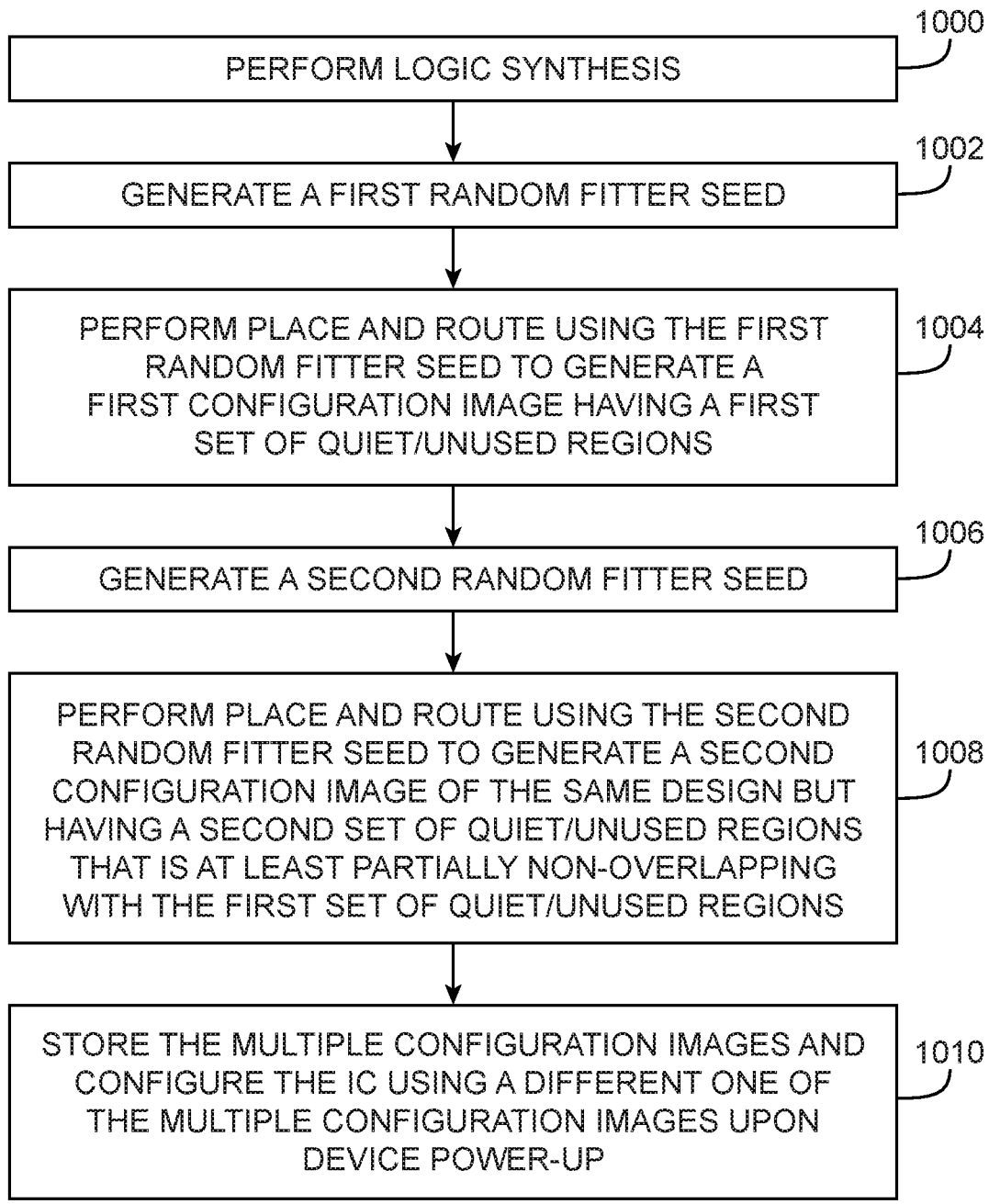
FIG. 10 is a flow chart of illustrative steps for generating multiple configuration bit streams using random fitter seeds to help achieve better circuit usage coverage in accordance with an embodiment.

FIG. 10 is a flow chart of illustrative steps for using circuit design tools (e.g., tools 320 of FIG. 3 and tools 420 of FIG. 4) to generate multiple configuration bit streams using random fitter seeds to help achieve better circuit usage coverage. At step 1000, the circuit design tools may perform logic synthesis (see logic synthesis step 508 in FIG. 5).

At step 1002, the circuit design tools may generate a first random fitter seed. At step 1004, the circuit design tools may perform place and route (see steps 512 and 515 in FIG. 5) operations to generate a first configuration image exhibiting a first set of quiet/unused regions. The first configuration image may be similar to image 900-1 of FIG. 9.

At step 1006, the circuit design tools may generate a second random fitter seed. At step 1008, the circuit design tools may again perform place and route operations to generate a second configuration image exhibiting a second set of quiet/unused regions. The second configuration image may be similar to image 90021 of FIG. 9, where the second set of quiet/unused regions is at least partially non-overlapping with the first set of quiet/unused regions.

The multiple device configuration images generated in this way may be stored locally on-chip or off-chip (such as on an external flash device). Device 10 may be reconfigured using a different one of the multiple configuration images every time device 10 is restarted (step 1010). Configured in this way, multiple configuration bit streams implementing the same design can be generated. The multiple bit streams are used in turn during reconfiguration to ensure that always quiet areas on device 10 is significantly reduced or eliminated. The exemplary steps of FIG. 10 in which the circuit design tools generate two different configuration devices are merely illustrative. If desired, the circuit design tools may generate more than two different configuration images using random fitter seeds.

If desired, the techniques described in connection with FIGS. 9 and 10 may also be applied in the case of partial reconfiguration (PR) to achieve better usage coverage in each reconfiguration. Consider a first PR scenario in which a first image PR(A) is used to partially reconfigure a first region A and a second image PR(B) is used to partially reconfigure a second region B. Consider a second scenario that uses random fitter seeds to generate different images; the first region A may be partially reconfigured using two or more images PR(A), PR(A'), and PR(A''), whereas second region may be partially reconfigured using two or more images PR(B) and PR(B'). In the second scenario, more configuration images are employed to help achieve the better usage coverage.

The steps shown in FIGS. 8 and 10 are merely illustrative and are not intended to limit the present embodiments. The existing steps may be modified or omitted; some of the steps may be performed in parallel; additional steps may be added; and the order of certain steps may be reversed or altered. Two or more different configuration images or bit streams can be generated by purposefully shifting quiet regions or by using random fitter seeds.

The embodiments thus far have been described with respect to integrated circuits. The methods and apparatuses described herein may be incorporated into any suitable circuit. For example, they may be incorporated into numerous types of devices such as programmable logic devices. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

EXAMPLES

The following examples pertain to further embodiments.

Example 1 is a method of using integrated circuit design tools to implement a given circuit design on an integrated circuit, the method comprising: with the integrated circuit design tools, generating a first configuration image to implement the given circuit design; with the integrated circuit design tools, generating a second configuration image that is different than the first configuration image, wherein the second configuration image also implements the given circuit design; configuring the integrated circuit using the first configuration image; and reconfiguring the integrated circuit using the second configuration image.

Example 2 is the method of example 1, further comprising: generating a physical netlist for the given circuit design; and running functional simulation on the physical netlist to obtain signal activity profile data.

Example 3 is the method of example 2, further comprising analyzing the signal activity profile data to identify a quiet region and a toggling region in the given circuit design.

Example 4 is the method of example 3, further comprising analyzing the signal activity profile data to identify an unused region in the given circuit design.

Example 5 is the method of example 4, wherein generating the second configuration image comprises replacing the quiet region with a selected one of the toggling region and the unused region to reduce aging on the integrated circuit.

Example 6 is the method of example 3, further comprising analyzing the signal activity profile data to identify a heavily-used conductive routing path and a lightly-used conductive routing path.

Example 7 is the method of example 6, wherein generating the second configuration image comprises swapping the heavily-used conductive routing path with the lightly-used conductive routing path to reduce electromigration on the integrated circuit.

Example 8 is the method of any one of examples 1-7, wherein: generating the first configuration image comprises using a first random fitter seed to perform place and route; the first configuration image has a first set of quiet regions; generating the second configuration image comprises using a second random fitter seed that is different than the first random fitter seed to perform place and route; the second configuration image has a second set of quiet regions that is at least partially non-overlapping with the first set of quiet regions.

Example 9 is the method of any one of examples 1-7, wherein: generating the first configuration image comprises using a first random fitter seed to perform place and route; the first configuration image has a first set of unused regions; generating the second configuration image comprises using a second random fitter seed that is different than the first random fitter seed to perform place and route; the second configuration image has a second set of unused regions that is at least partially non-overlapping with the first set of unused regions.

Example 10 is the method of any one of examples 1-7, wherein the first and second images comprise partial reconfiguration images.

Example 11 is an integrated circuit, comprising: programmable logic circuitry that is configured to implement a given circuit design using a first configuration image, wherein the programmable logic circuitry is reconfigured to implement the given circuit design using a second configuration image that is different than the first configuration image in response to restarting the integrated circuit.

Example 12 is the integrated circuit of example 11, wherein: the first configuration image configures a first portion of the programmable logic circuitry as a quiet region and configures a second portion of the programmable logic circuitry as a toggling region; and the second configuration image reconfigures the first portion of the programmable logic circuitry as the toggling region and reconfigures the second portion of the programmable logic circuitry as the quiet region.

Example 13 is the integrated circuit of example 11, wherein: the first configuration image configures a first portion of the programmable logic circuitry as a quiet region and configures a second portion of the programmable logic circuitry as an unused region; and the second configuration image reconfigures the first portion of the programmable logic circuitry as the unused region and reconfigures the second portion of the programmable logic circuitry as the quiet region.

Example 14 is the integrated circuit of example 11, wherein: the first configuration image configures a first conductive routing path in the programmable logic circuitry to convey a first amount of current and configures a second conductive routing path in the programmable logic circuitry to convey a second amount of current that is less than half of the first amount of current; and the second configuration image reconfigures the first conductive routing path in the programmable logic circuitry to convey the second amount of current and reconfigures the second conductive routing path in the programmable logic circuitry to convey the first amount of current.

Example 15 is the integrated circuit of example 11, wherein: the first configuration image is generated using a first random fitter seed and has a first usage coverage region on the integrated circuit; and the second configuration image is generated using a second random fitter seed and has a second usage coverage region on the integrated circuit that is different than the first usage coverage region.

Example 16 is a non-transitory computer-readable storage medium comprising instructions for: generating a first configuration image to implement a circuit design; generating a second configuration image that is different than the first configuration image, wherein the second configuration image implements the same circuit design as the first configuration image; and taking turns reconfiguring an integrated circuit using at least the first and second configuration images.

Example 17 is the non-transitory computer-readable storage medium of example 16, further comprising instructions for: generating a physical netlist; performing functional simulation on the physical netlist to obtain activity profile data; and analyzing the activity profile data to identify first and second different region types in the circuit design, wherein generating the second configuration image comprises replacing the first region type with the second region type.

Example 18 is the non-transitory computer-readable storage medium of example 16, further comprising instructions for: identifying first and second different metal types in the circuit design, wherein generating the second configuration image comprises swapping the first and second different metal types.

Example 19 is the non-transitory computer-readable storage medium of example 16, further comprising instructions for: using a first random fitter seed to generate the first configuration image; and using a second random fitter seed that is different than the first random fitter seed to generate the second configuration image.

Example 20 is the non-transitory computer-readable storage medium of any one of examples 16-19, further comprising instructions for: generating a third configuration image that is different than the first and second configuration images, wherein the third configuration image also implements the same circuit design as the first and second configuration images; and taking turns reconfiguring the integrated circuit using at least the first, second, and third configuration images in response to restarting the integrated circuit.

Example 21 is an integrated circuit, comprising: means for implementing a given circuit design on the integrated circuit using a first configuration image and for implementing the given circuit design on the integrated circuit using a second configuration image that is different than the first configuration image in response to restarting the integrated circuit.

Example 22 is the integrated circuit of example 21, wherein: the first configuration image configures a first portion of the means as a quiet region and configures a second portion of the means as a toggling region; and the second configuration image reconfigures the first portion of the means as the toggling region and reconfigures the second portion of the means as the quiet region.

Example 23 is the integrated circuit of example 21, wherein: the first configuration image configures a first portion of the means as a quiet region and configures a second portion of the means as an unused region; and the second configuration image reconfigures the first portion of the means as the unused region and reconfigures the second portion of the means as the quiet region.

Example 24 is the integrated circuit of example 21, wherein: the first configuration image configures a first conductive routing path in the means to convey a first amount of current and configures a second conductive routing path in the means to convey a second amount of current that is less than half of the first amount of current;

and the second configuration image reconfigures the first conductive routing path in the means to convey the second amount of current and reconfigures the second conductive routing path in the means to convey the first amount of current.

Example 25 is the integrated circuit of example 21, wherein: the first configuration image is generated using a first random fitter seed and has a first usage coverage region on the integrated circuit; and the second configuration image is generated using a second random fitter seed and has a second usage coverage region on the integrated circuit that is different than the first usage coverage region.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A method of using integrated circuit design tools to implement a circuit design on an integrated circuit, the method comprising:
    with the integrated circuit design tools, generating a first configuration image to implement the circuit design using a first random fitter seed to perform place and route;
    with the integrated circuit design tools, generating a second configuration image that is different than the first configuration image using a second random fitter seed that is different than the first random fitter seed to perform place and route, wherein the second configuration image implements the circuit design;
    configuring the integrated circuit using the first configuration image; and
    reconfiguring the integrated circuit using the second configuration image.

2. The method of claim 1, further comprising:
    generating a physical netlist for the circuit design; and
    running functional simulation on the physical netlist to obtain signal activity profile data.

3. The method of claim 2, further comprising analyzing the signal activity profile data to identify a quiet region and a toggling region in the circuit design.

4. The method of claim 3, further comprising analyzing the signal activity profile data to identify an unused region in the circuit design.

5. The method of claim 4, wherein generating the second configuration image comprises replacing the quiet region with a selected one of the toggling region and the unused region to reduce aging on the integrated circuit.

6. The method of claim 3, further comprising analyzing the signal activity profile data to identify a heavily-used conductive routing path and a lightly-used conductive routing path.

7. The method of claim 6, wherein generating the second configuration image comprises swapping the heavily-used conductive routing path with the lightly-used conductive routing path to reduce electromigration on the integrated circuit.

8. The method of claim 1, wherein:
    the first configuration image has a first set of quiet regions;
    and wherein
    the second configuration image has a second set of quiet regions that is at least partially non-overlapping with the first set of quiet regions.

9. The method of claim 1, wherein the first and second configuration images comprise partial reconfiguration images.

10. A method of using integrated circuit design tools to implement a circuit design on an integrated circuit, the method comprising:
   with the integrated circuit design tools, generating a first configuration image to implement the circuit design using a first random fitter seed to perform place and route, wherein the first configuration image has a first set of unused regions;
   with the integrated circuit design tools, generating a second configuration image that is different than the first configuration image using a second random fitter seed that is different than the first random fitter seed to perform place and route, wherein the second configuration image implements the circuit design, and wherein the second configuration image has a second set of unused regions that is at least partially non-overlapping with the first set of unused regions;
   configuring the integrated circuit using the first configuration image; and
   reconfiguring the integrated circuit using the second configuration image.

11. The method of claim 10, further comprising:
   generating a physical netlist for the circuit design; and
   running functional simulation on the physical netlist to obtain signal activity profile data.

12. The method of claim 10, wherein the first and second configuration images comprise partial reconfiguration images.

13. The method of claim 10 further comprising:
   generating a third configuration image that is different than the first and second configuration images, wherein the third configuration image implements the circuit design; and
   reconfiguring the integrated circuit using the third configuration image.

14. A non-transitory computer-readable storage medium comprising instructions for:
   generating a first configuration image to implement a circuit design using a first random fitter seed;
   generating a second configuration image that is different than the first configuration image using a second random fitter seed that is different than the first random fitter seed, wherein the second configuration image implements the same circuit design as the first configuration image; and
   configuring an integrated circuit using the first configuration image;
   reconfiguring the integrated circuit using the second configuration image.

15. The non-transitory computer-readable storage medium of claim 14, further comprising instructions for:
   generating a physical netlist;
   performing functional simulation on the physical netlist to obtain activity profile data; and
   analyzing the activity profile data to identify first and second different region types in the circuit design, wherein generating the second configuration image comprises replacing the first region type with the second region type.

16. The non-transitory computer-readable storage medium of claim 14, further comprising instructions for:
   identifying first and second different metal types in the circuit design, wherein generating the second configuration image comprises swapping the first and second different metal types.

17. The non-transitory computer-readable storage medium of claim 14, further comprising instructions for:
   generating a third configuration image that is different than the first and second configuration images, wherein the third configuration image also implements the same circuit design as the first and second configuration images; and
   taking turns reconfiguring the integrated circuit using at least the first, second, and third configuration images in response to restarting the integrated circuit.

18. The non-transitory computer-readable storage medium of claim 14, wherein the first configuration image has a first set of quiet regions, and the second configuration image has a second set of quiet regions that is at least partially non-overlapping with the first set of quiet regions.

19. The non-transitory computer-readable storage medium of claim 14, wherein the first configuration image has a first set of unused regions, and the second configuration image has a second set of unused regions that is at least partially non-overlapping with the first set of unused regions.

* * * * *